(12) United States Patent
Schmidt et al.

(10) Patent No.: US 8,283,178 B2
(45) Date of Patent: Oct. 9, 2012

(54) METHOD AND APPARATUS FOR REMOVING HALOGEN HYDRACIDS FROM BIOMASS HYDROLYSATES

(75) Inventors: Matthias Schmidt, Dresden (DE); Frank Kose, Berlin (DE)

(73) Assignee: Green Sugar GmbH, Meissen (DE)

( * ) Notice: Subject to any disclaimer, the term of this patent is extended or adjusted under 35 U.S.C. 154(b) by 0 days.

(21) Appl. No.: 12/991,611

(22) PCT Filed: May 2, 2009

(86) PCT No.: PCT/DE2009/000633
§ 371 (c)(1), (2), (4) Date: Nov. 8, 2010

(87) PCT Pub. No.: WO2009/135480
PCT Pub. Date: Nov. 12, 2009

(65) Prior Publication Data
US 2011/0070131 A1    Mar. 24, 2011

(30) Foreign Application Priority Data
May 6, 2008   (DE) .......................... 10 2008 022 242

(51) Int. Cl.
*G01N 25/22*   (2006.01)
(52) U.S. Cl. .......................... 436/158; 423/341; 422/145

(58) Field of Classification Search .......... 422/139–145; 436/158; 423/341
See application file for complete search history.

(56) References Cited

U.S. PATENT DOCUMENTS

| 4,237,110 A | 12/1980 | Forster et al. |
| 5,868,851 A | 2/1999 | Lightner |
| 5,968,362 A | 10/1999 | Russo, Jr. |
| 6,391,204 B1 | 5/2002 | Russo, Jr. |
| 2003/0013606 A1 | 1/2003 | Hampden-Smith et al. |

FOREIGN PATENT DOCUMENTS

| EP | 0 018 621 A1 | 11/1980 |
| WO | 99/06133 A1 | 2/1999 |

*Primary Examiner* — Lyle Alexander
(74) *Attorney, Agent, or Firm* — Michael Soderman

(57) ABSTRACT

A process for removing hydrogen halide and water from hydrolyzates obtained by way of halogen-acid hydrolysis from vegetable biomasses. Two containers are connected to each other via a tube. Two flows are fed in at the inlet of the first container, one representing the hydrolyzates and the other a heat transfer medium; both flows are sprayed together in the first container, producing a homogeneous mixing of the two flows, including heat transfer, which subsequently results in complete evaporation of water and the hydrogen halide dissolved in the hydrolyzates. The evaporation produces a mixture of granular solid bodies and heat transfer medium droplets that is pulled from the first container into the second container through the connecting tube via a pressure gradient. The second container is configured as a cyclone or centrifugal force precipitator, and there is a separation of liquid and solid constituents from the gas.

2 Claims, No Drawings

METHOD AND APPARATUS FOR REMOVING HALOGEN HYDRACIDS FROM BIOMASS HYDROLYSATES

PRIOR ART

It is known that biomasses, in particular vegetable biomasses, can be hydrolyzed by means of treatment by acids. Hydrolysis is of economic interest, since by means of its action polymeric carbohydrates such as, for example, cellulose and hemicellulose, but also all other polycarbohydrates, can be split into their monomers and thus made available for technical utilization. With the monomeric carbohydrate, a basic structural unit is present which is available as a starting point for numerous substance conversion chains and thus product family trees. In addition, hydrolysis is observed by means of highly concentrated halogen hydracids. These have the property that they can be removed by distillation after hydrolysis is complete. This has the advantage that they can be circulated or reused. Below, we consider hydrolysis by means of hydrochloric acid exemplarily, since in the economic sense this had found the widest spread. The mode of action of the invention is not affected thereby.

Hydrolysis by means of hydrochloric acid always takes place in aqueous medium (hydrogen chloride dissolved in water is furthermore called hydrochloric acid) and in reactors provided for this purpose according to the extraction principle (see, for example, DE 927 139/EP 1878480 A1). As a result of this step, various batches of hydrolyzates are formed, which each contain, according to the mode of operation of the reactors, different amounts of hydrochloric acid (hydrogen chloride gas dissolved in water) and carbohydrates dissolved out of the biomass. Common to all, however, is the basic composition of hydrochloric acid, carbohydrates and likewise concomitant substances dissolved out of the biomass, such as amino acids, mineral acids and other metabolic intermediates. For further treatment, it is unavoidable to remove the hydrochloric acid from the mixture, since, firstly, the hydrochloric acid should be supplied for reuse and secondly, the hydrochloric acid has an inconvenient effect in the case of further use of the valuable substances obtained from the plant. The effectiveness and apparatus design of this step has all along been the focus of intensive development efforts, since the removal of the hydrochloric acid places significant requirements on the materials used and significant amounts of energy are needed. Thus this intermediate step is substantially co-determining for the economy of the overall process on the cost side.

The separation of the hydrochloric acid is carried out by means of distillation. For this, use is made of the fact that, as mentioned above, hydrochloric acid is hydrogen chloride gas dissolved in water, which can be driven off by means of warming. Moreover, hydrogen chloride gas and water form an azeotropic mixture. Depending on the pressure above the liquid, a specific proportion of hydrogen chloride gas dissolved in water arises. If the concentration of hydrogen chloride lies above this point, hydrogen chloride changes exclusively into the gas phase. This mixture is designated here as a hyperazeotropic mixture. If the concentration of hydrogen chloride lies below this point, water changes exclusively into the gas phase. We speak at this point of a hypoazeotropic mixture.

The apparatus design of the distillation was usually carried out by means of externally heated evaporators (compare, for example, DBP 1059850). Great efforts were undertaken in order to optimize parameters such as the residence time of the hydrolyzate and the separation effect. The disadvantage of this technique is the constructively restricted heat flow. Heat transfer always takes place here via a separating wall. This opposes a resistance to the heat flow, such that in the case of a certain temperature gradient only a heat flow restricted by this resistance is transferred. Moreover, the total heat flow is restricted by the exchange surface, which the heat-exchanging media wet.

A technical solution is known in which a liquid not soluble in water is mixed directly with the hydrolyzate as a heat transfer medium, (German Patent No. 362230). Such liquids are, for example, shale oils. In this technical solution, the heat transfer medium is removed from the sugar solution, by choice by deposition, after the hydrochloric acid has been completely removed from the hydrolyzate. The heat transfer medium was then subjected to treatments of two different kinds, since excessively small portions of hydrochloric acid has been dissolved or absorbed in this. First it was dried, that is water was removed. This took place by leading the heat transfer medium over calcium chloride. The background was the aggressiveness of aqueous hydrochloric acid to metallic materials. Residues of hydrogen chloride remain in the heat transfer medium, but are no longer aggressive after dehydration. These residues were removed in the second step by thermal expulsion.

THE INVENTION

The object of the invention is to conduct the treatment of the mixture of heat transfer medium and the hydrolyzate such that removal of water and hydrogen chloride takes place in one step. By this means, aftertreatment of the heat transfer medium can be avoided and the outlay in terms of apparatus falls as a result of a reduction of the process steps. Due to the conduct, the apparatus can in some cases be constructed in inexpensive materials.

DESCRIPTION OF THE INVENTION

The apparatus is subdivided into two containers, which are connected to each other by a tube connection. At the entrance of the first container, two flows are introduced. One is the hydrolyzates, consisting of the carbohydrates, plant constituents and salts dissolved out of the biomass by means of aqueous halogen hydracids, and the dissolved halogen hydracids themselves. The other is a heated heat transfer medium, which only dissolves to an economically justifiable extent in the hydrolyzates or concentrates constituents of the hydrolyzate. "Economically justifiable" therefore, since the heat transfer medium functions here as a transfer medium for the thermal energy and not as an adsorbent. Possible impurities due to the absorption of substances of any type need no additional economical expenditure in the form of further process steps. For example, oils of paraffinic origin can be used. The introduction of both streams takes place by means of mutual spraying into the first container. It is unimportant whether the spraying takes place by means of a common nozzle or separate nozzles. It is important within the meaning of the invention that via the droplet formation of both media in a common space intimate mixing takes place and at the same time the liquid surface is greatly enlarged.

This has the result that a very rapid heat transfer takes place between hydrolyzates and heat transfer medium. Hydrogen halide and water change into the gas phase on account of this heat transfer. From the ingredients dissolved in the hydrolyzate, granular solids are formed, which in some cases are wetted with the heat transfer medium. These solids or heat transfer medium droplets are drawn off from the container 1 by means of a pressure gradient. This advantageously takes place by means of an underpressure in the second container. By means of this underpressure, the solids or oil droplets are drawn into the second container by the connecting tube. The second container is designed as a cyclone (centrifugal force separator) so that a complete separation of the water and hydrogen halide changed into the gas phase takes place here from the liquid and solid constituents of the flow. A corresponding arrangement of the connecting tube to container 2 is provided. At the outlet of the second container in turn two flows accordingly result. One corresponds to the gas flow in the described composition. The other corresponds to a suspension of granular solids and the heat transfer medium.

The first container can be divided into a spraying-in zone and an evaporation zone. The temperatures occurring here vary in a range between 90° C. and 120° C. This container is therefore manufactured from materials that are insensitive to halogen hydracids in this temperature range. Owing to the evaporation process, a temperature decrease takes place in the evaporation region. In the second container, acid-resistant plastics can therefore be employed as a lining, since the temperature here is in a range below 70° C. Such acid-resistant materials are or can be:
polyvinyl chloride [PVC] (hard),
PVC (post-chlorinated),
polyethylene (PE),
polypropylene (PP),
polybutylene (PB),
polytetrafluoroethylene (PTFE),
polyvinylidene fluoride (PVDF),
polyvinyl fluoride (PVF),
ethylene-propylene-diene rubber (EPDM),
ethylene-propylene copolymer,
ethylene-tetrafluoroethylene (ETFE),
perfluoroethylene-propylene plastic (FEP),
fluoropolymer plastics (FPM and FKM=group description),
perfluorotrifluoroethylene (PCTFE),
perfluorinated rubber (FFPM and FFKM),
butyl rubber (IIR),
isoprene rubber (IR),
chlorinated polyethylene (PE-C),
rubber (collective description for rubbers containing sulfur) and can be copolymers and mixtures of these polymers.

This is important within the meaning of the invention, since this possibility follows explicitly from the preceding arrangement of the heat transfer (spraying and evaporation incl. cooling) and is economically relevant. By use of these inexpensive plastics, investment costs can potentially be saved, since alternative materials, for example in the form of ceramics, generate higher costs.

In summary, the apparatus presented accordingly has the following advantages:
Hydrogen halide and water are completely removed in one step.
An aftertreatment of the heat transfer medium in the form of a dehydration or hydrogen halide removal is unnecessary.
The apparatus can partially be constructed in inexpensive materials by the effective arrangement of the heat transfer.

The invention claimed is:

1. A process for removing hydrogen halide and water from hydrolyzates obtained by means of halogen acid hydrolysis of vegetable biomasses characterized in that:
  a. two streams of substances are fed into a first container in a first step, wherein the first substance stream is the hydrolyzates and the second substance stream is a heat transfer fluid, preferably a paraffin-based oil, that has been heated up,
  b. both streams are subsequently jointly sprayed into the first container as a homogeneous mixture with a heat transfer in a temperature range of 90° C. to 120° C. from the heat transfer fluid droplets to the hydrolyzate fluid droplets, wherein complete vaporization of the water contained in the hydrolyzate and of the hydrogen halide dissolved in the hydrolyzate simultaneously takes place,
  c. wherein a mixture of granular solid particles that were dissolved in the hydrolyzates and heat transfer medium droplets arising during the vaporization can be removed by means of a pressure gradient from the first container through a connection tube into a second container, and
  d. liquid heat transfer fluid droplets and granular solid particles are separated from the gas flow with subsequent separate removal in the second container designed in the form of a cyclone or centrifugal separator.

2. A process according to claim 1, wherein the second container can have the interior wall lined with, or can have an interior wall consisting of, hard polyvinyl chloride, post-chlorinated PVC, polyethylene, polypropylene, polybutylene, polytetrafluoroethylene, polyvinylidene fluoride, polyvinyl fluoride, ethylene-propylene-diene rubber, ethylene-propylene copolymer, ethylene-tetrafluoroethylene, perfluoroethylene-propylene plastic, fluoropolymer plastics, perfluoro trifluoroethylene, perfluorinated rubber, butyl rubber, isoprene rubber, chlorinated polyethylene or rubber and copolymers and mixtures of theses polymers.

* * * * *